(No Model.)
J. M. SHERMAN.
MACHINE FOR TURNING SPOKE TENONS.
No. 458,276. Patented Aug. 25, 1891.
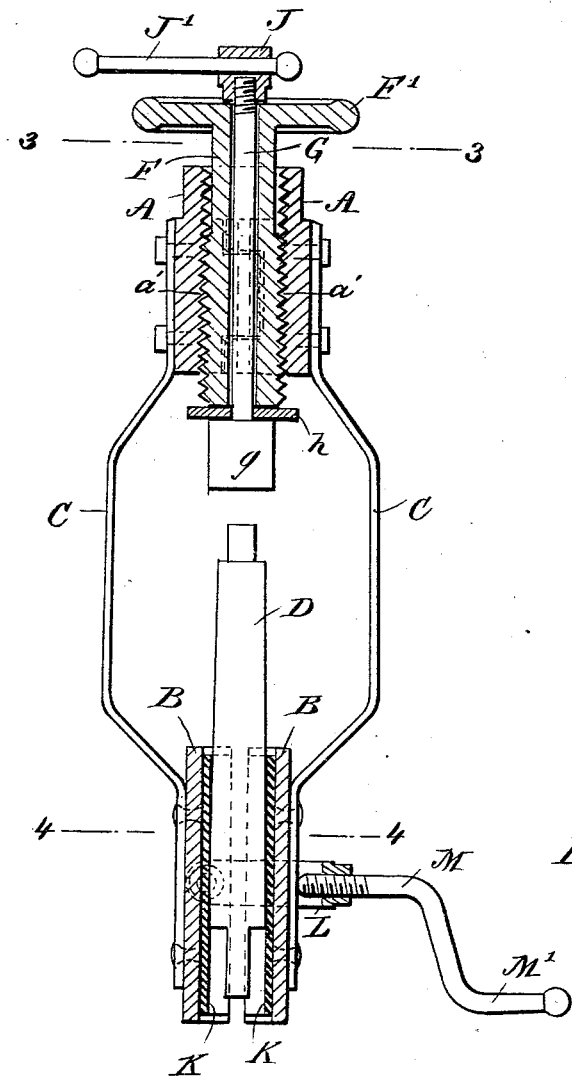
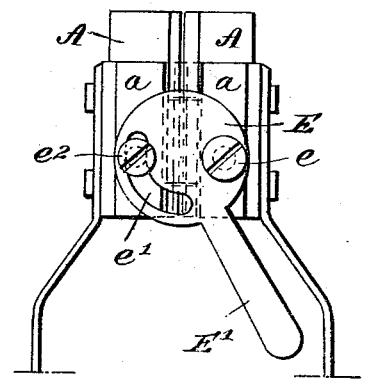
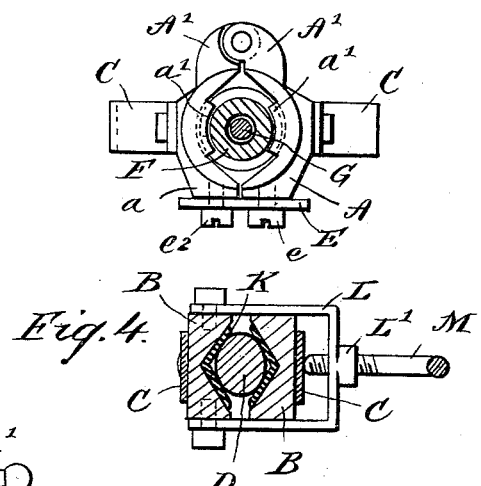
WITNESSES:
Donn Twitchell
E. M. Clark
INVENTOR:
J. M. Sherman
BY
ATTORNEYS

UNITED STATES PATENT OFFICE.

JEFFERSON M. SHERMAN, OF BRUSHTON, NEW YORK.

MACHINE FOR TURNING SPOKE-TENONS.

SPECIFICATION forming part of Letters Patent No. 458,276, dated August 25, 1891.

Application filed October 3, 1890. Serial No. 367,011. (No model.)

*To all whom it may concern:*

Be it known that I, JEFFERSON M. SHERMAN, of Brushton, in the county of Franklin and State of New York, have invented a new and Improved Machine for Turning Spoke-Tenons, of which the following is a full, clear, and exact description.

My invention relates to improvements in that class of machines which are used for turning tenons on wheel-spokes, and especially the spokes of carriage-wheels; and the object of my invention is to produce a machine of simple construction that may be easily operated and by means of which spoke-tenons may be rapidly and accurately turned.

To this end my invention consists in two aligning pairs of jaws, one of said pairs of jaws carrying the feed and cutting mechanism and the other pair being adapted to hold the spoke. This construction will be hereinafter fully described, and then pointed out in the claims.

Reference is to be had to the accompanying drawings, forming a part of this specification, in which similar letters of reference indicate corresponding parts in all the figures.

Figure 1 is a vertical transverse section of the machine embodying my invention. Fig. 2 is a detail front elevation of the upper jaws and the mechanism for locking the same. Fig. 3 is a sectional plan on the line 3 3 of Fig. 1, and Fig. 4 is a sectional plan of the lower jaws on the line 4 4 of Fig. 1.

The machine is provided with two aligning pairs of jaws A and B, the upper jaws A carrying the cutting and feeding mechanism and the lower jaws B being adapted to hold the spokes D. The jaws are connected by the vertical bars C, which are preferably of spring-steel, and which thus allow for the varying sizes of spokes, and which also permit the easy and rapid adjustment of the feed mechanism, as described below. The upper jaws A are provided with rearwardly-extending ears A', which are hinged together, and the front faces of the jaws are flat, as shown at $a$, so that the locking-disk E may fit firmly against the front of the jaws. The jaws have each a concaved interior face, so that when closed there will be a vertical bore extending between the jaws, and the inner face of each jaw is provided with a threaded portion $a'$, adapted to engage the feed-sleeve, as described below. The disk E is eccentrically pivoted to the front face of one of the jaws A by the screw $e$, so that it will overlap the opposite jaw, and the part of the disk opposite the pivoted portion is provided with a curved slot $e'$, through which extends a screw $e^2$, said screw being fixed in said opposite jaw A. The disk is provided with a depending handle E', and by turning the disk the cam-like surface of the slot $e'$ is brought to bear upon the screw $e^2$, and the jaws A may thus be opened or closed, as desired. A sleeve F extends vertically between the jaws A, the said sleeve being threaded exteriorly to mesh with the thead $a'$ of the jaws A. The sleeve F is provided with a hand-wheel F' at the top, and by turning the wheel the position of the sleeve in the jaws may be changed. The spindle G extends vertically through the sleeve F, the said spindle carrying at its lower end a cutter-head or hollow auger $g$ of the usual construction, and a suitable washer $h$ is interposed between the cutter-head and the lower end of the sleeve F. A cap J is screwed upon the upper end of the spindle G, the cap having a laterally-extending handle J', and by turning the handle the spindle and cutter-head are revolved and a tenon turned upon the spoke D. The lower jaws B align with the upper jaws A, as described, and the inner faces of the lower jaws are angular, as best shown in Fig. 4, and are provided with a lining K, which is preferably of rubber, and it will thus be seen that the jaws may be made to bear firmly upon a spoke, and thus hold it in place without injuring or scarring it. A yoke L is pivoted to one of the lower jaws B, so as to inclose the opposite jaw and allow for the necessary play or movement of the jaws, and said yoke is provided with the central thickened portion L', through which extends a rod M, so as to impinge on one of the bars C at the point where the bar is joined to the jaw. The rod M and the thickened portion L' of the yoke are screw-threaded, and the rod M is provided with a crank-handle M', so that by turning the handle the rod may be turned out or in, as desired, and the position of the jaws B correspondingly changed.

When the rod is turned inward, the jaws are forced together, and when the rod is turned outward the spring of the bars C forces the jaws apart.

The machine is operated as follows: A spoke D is placed vertically between the lower jaws B, and the jaws are tightened by the rod M, so as to hold the spoke firmly in position. The upper jaws A are forced apart by means of the eccentric-disk E, thus allowing the sleeve F to drop, so that the cutter-head H will rest upon the upper end of the spoke D. The jaws A are then closed by means of the disk E, so that the threaded portions of the jaws will engage the threaded sleeve F, and the spindle G and cutter-head g are then turned by means of the handle J', and the cutter-head thus cuts a tenon upon the spoke. As the cutter-head revolves it may be forced downward upon the spoke by turning the sleeve F, so that it will be fed downward at a desired speed. When the tenon is cut, the jaws A are forced apart, the sleeve F raised, the spoke D removed, and the operation may then be repeated. It will be observed that by forcing the jaws A apart the sleeve F and cutter-head G may be quickly moved into nearly the exact position required, and that then by closing the jaws the said parts may be more nicely adjusted by turning the wheel F' and sleeve F, as described.

Having thus fully described my invention, I claim as new and desire to secure by Letters Patent—

1. A machine for turning spoke-tenons, consisting, essentially, of two aligning pairs of jaws connected by spring-bars, one pair of jaws being adapted to hold a spoke and the opposite pair carrying a revoluble cutter-head, substantially as described.

2. A machine for turning spoke-tenons, comprising two aligning pairs of jaws connected by spring-bars, one pair of said jaws being adapted to hold a spoke and the opposite pair being hinged together and provided with a locking device, as shown, and also carrying a revoluble cutter-head and suitable feed mechanism, substantially as described.

3. A machine for turning spoke-tenons, comprising two aligning pairs of jaws connected by spring-bars, the lower jaws being adapted to hold a spoke and the upper jaws being hinged together, provided with a locking device and a threaded bore, a threaded sleeve adapted to turn in said threaded bore and provided with a hand-wheel, as shown, and a spindle extending through said sleeve, the lower end of the said spindle carrying a cutter-head and the upper end being provided with a handle, substantially as described.

JEFFERSON M. SHERMAN.

Witnesses:
J. S. QUINN,
M. V. QUINN.